(12) United States Patent
Chang

(10) Patent No.: US 7,254,784 B2
(45) Date of Patent: Aug. 7, 2007

(54) USER-DRIVEN MENU GENERATION SYSTEM WITH MULTIPLE SUBMENUS

(75) Inventor: Peter H. Chang, 2310 Camel Dr., Sterling Heights, MI (US) 48310

(73) Assignee: Peter H. Chang, Sterling Heights, MI (US)

( * ) Notice: Subject to any disclaimer, the term of this patent is extended or adjusted under 35 U.S.C. 154(b) by 861 days.

(21) Appl. No.: 10/639,940

(22) Filed: Aug. 13, 2003

(65) Prior Publication Data

US 2004/0046804 A1   Mar. 11, 2004

Related U.S. Application Data

(60) Provisional application No. 60/409,835, filed on Sep. 11, 2002.

(51) Int. Cl.
*G06F 17/00* (2006.01)
(52) U.S. Cl. .................. 715/810; 715/825; 715/826
(58) Field of Classification Search ......... 715/810–846
See application file for complete search history.

(56) References Cited

U.S. PATENT DOCUMENTS

| | | | | |
|---|---|---|---|---|
| 4,974,160 A | * | 11/1990 | Bone et al. ................. | 715/751 |
| 5,041,967 A | * | 8/1991 | Ephrath et al. ............. | 715/825 |
| 5,220,675 A | * | 6/1993 | Padawer et al. ............ | 715/826 |
| 5,345,550 A | * | 9/1994 | Bloomfield ................. | 715/841 |
| 5,530,796 A | * | 6/1996 | Wang .......................... | 715/762 |
| 5,625,783 A | * | 4/1997 | Ezekiel et al. .............. | 719/320 |
| 5,630,125 A | * | 5/1997 | Zellweger ................ | 707/103 R |
| 5,760,768 A | * | 6/1998 | Gram ........................ | 715/747 |
| 5,778,389 A | * | 7/1998 | Pruett et al. ................ | 707/204 |
| 5,784,583 A | * | 7/1998 | Redpath ..................... | 715/841 |
| 5,799,325 A | * | 8/1998 | Rivette et al. .............. | 715/500 |
| 5,877,966 A | * | 3/1999 | Morris et al. ................. | 716/4 |
| 5,999,180 A | * | 12/1999 | Coskrey, IV ............... | 715/810 |
| 6,067,087 A | * | 5/2000 | Krauss et al. .............. | 715/762 |

(Continued)

*Primary Examiner*—Tadesse Hailu
(74) *Attorney, Agent, or Firm*—Knobbe, Martens, Olson & Bear LLP

(57) ABSTRACT

A menu generation system and method for use by ordinary computer users enables those users to readily construct and modify menus and submenus to execute user-prepared commands. The system comprises a program operable by such users to construct a viewable main menu with a plurality of user-defined choices thereon, and if desired a number of levels of viewable submenus, which also may have a plurality of user-selected choices thereon. The program includes various components operable by such a user for carrying certain steps or procedures. The first component is used to construct the viewable main menu, and it automatically provides at least first, second and third user-selectable choices on the main menu. The first menu choice is for creating a new menu item on the main menu. The second menu choice is for creating a new submenu. The third menu choice is for quitting the current menu. The second component is used to modify the content of the main menu and the content of any submenus as a menu item. A third component is used to create a submenu from a main menu. A fourth component is to create and modify a plurality of storage locations used by the menu generation system for storing operating commands used by the menu generation system for launching other executable programs accessible to the computer user, and for storing data that is referenced as part of creating and displaying user-viewable menus.

14 Claims, 19 Drawing Sheets

U.S. PATENT DOCUMENTS

| | | | |
|---|---|---|---|
| 6,177,942 B1 * | 1/2001 | Keong et al. | 715/810 |
| 6,243,700 B1 * | 6/2001 | Zellweger | 707/3 |
| 6,317,143 B1 * | 11/2001 | Wugofski | 715/765 |
| 6,317,787 B1 | 11/2001 | Boyd et al. | |
| 6,487,713 B1 * | 11/2002 | Cohen et al. | 717/105 |
| 6,751,306 B2 | 6/2004 | Himmel et al. | |
| 6,826,566 B2 * | 11/2004 | Lewak et al. | 707/4 |
| 6,904,568 B2 * | 6/2005 | Colgrove | 715/839 |
| 7,027,975 B1 * | 4/2006 | Pazandak et al. | 704/9 |
| 2001/0002128 A1 * | 5/2001 | Takayama et al. | 345/352 |
| 2002/0065818 A1 * | 5/2002 | Starr | 707/5 |
| 2003/0098891 A1 * | 5/2003 | Molander | 345/841 |
| 2003/0131340 A1 * | 7/2003 | McArdle | 717/115 |

* cited by examiner

| Key | CmdArray[key] |
|---|---|
| a | autoGenMenu.exe |
| e | excel.exe |
| p | powerpnt.exe |
| w | winword.exe |

Utility;e utility.xls;Utility
Insurance;e insurance.xls;Insurance
Credit Card;e creditcard.xls;Credit Card
Bank Account;e bank.xls;Bank Account
Phone;e phone.xls;Phone
Taxes;e taxes.xls;Taxes
Trip;a menu1;Trip
Concerts;a concert.txt;Concerts
Presentation;p Presentation1.ppt;Presentation
Others;e others.xls;Others
Summary;e summary.xls;Summary

| Descriptive Names | Displaying fields (of length 24) inside double quotes |
|---|---|
| Utility | "0) Utility            " |
| Insurance | "1) Insurance          " |
| Credit Card | "2) Credit Card        " |
| Bank Account | "3) Bank Account       " |
| Phone | "4) Phone              " |
| Taxes | "5) Taxes              " |
| Trip | "6) Trip               " |
| Concerts | "7) Concerts           " |
| Presentation | "8) Presentation       " |
| Others | "9) Others             " |
| Summary | "10) Summary           " |

FIG. 7

| Index | Element of Processing Command Array with this index value |
|---|---|
| 1 | excel.exe utility.xls |
| 2 | excel.exe insurance.xls |
| 3 | excel.exe creditcard.xls |
| 4 | excel.exe bank.xls |
| 5 | excel.exe phone.xls |
| 6 | excel.exe taxes.xls |
| 7 | autoGenMenu.exe menu1 |
| 8 | autoGenMenu.exe concert.txt |
| 9 | excel.exe others.xls |
| 10 | excel.exe summary.xls |

Automatically Generated Menu

Links: main

0) Utility           1) Insurance         2) Credit Card
3) Bank Account      4) Phone             5) Taxes
6) Trip              7) Concerts          8) Presentation
9) Others            10) Summary
nmi) new menu item   nms) new submenu     q) quit Choice:

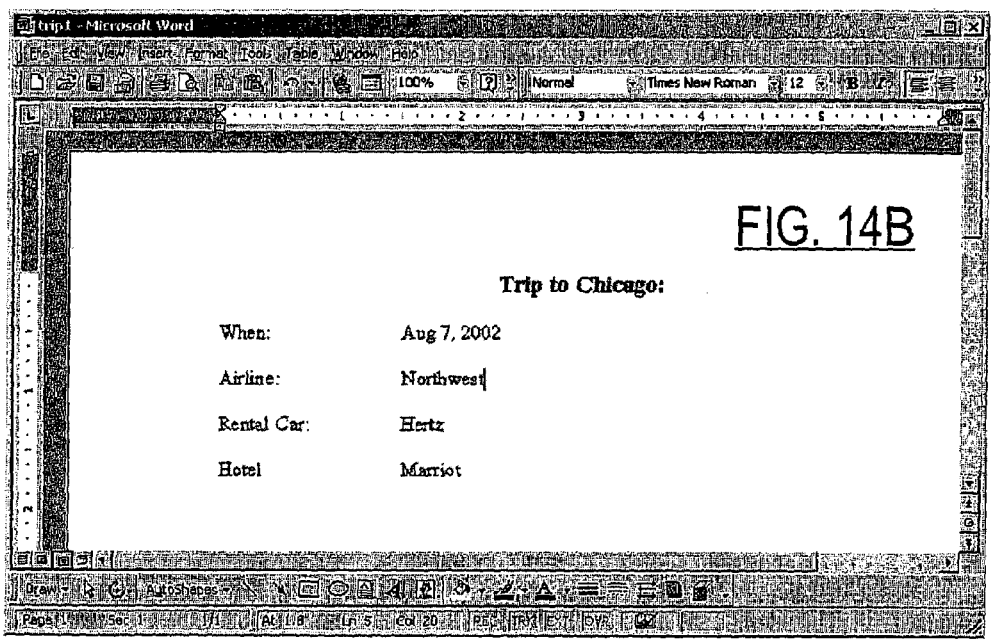

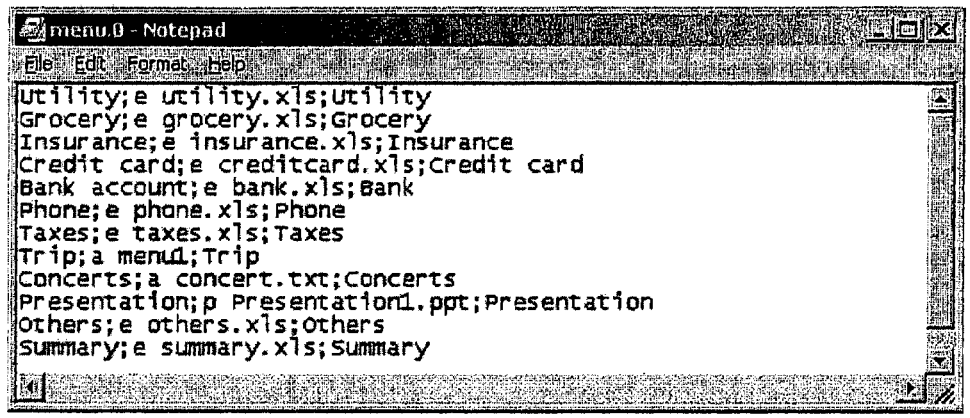
FIG. 16
---
Automatically Generated Menu
Links: main
| 0) Utility | 1) Grocery | 2) Insurance |
| 3) Credit Card | 4) Bank Account | 5) Phone |
| 6) Taxes | 7) Trip | 8) Concerts |
| 9) Presentation | 10) Others | 11) Summary |
| nmi) new menu item | nsm) new submenu | q) quit |
Choice:
FIG. 17
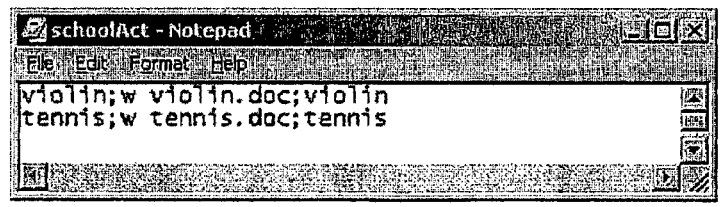
FIG. 18

| | | |
|---|---|---|
| Automatically Generated Menu | | |
| Links: main | | |
| 0) Utility | 1) Grocery | 2) Insurance |
| 3) Credit Card | 4) Bank Account | 5) Phone |
| 6) Taxes | 7) Trip | 8) Concerts |
| 9) Presentation | 10) Others | 11) Summary |
| 12) Kids' Activity | | |
| nmi) new menu item | nms) new submenu | q) quit |
| Choice: | | |

USER-DRIVEN MENU GENERATION SYSTEM WITH MULTIPLE SUBMENUS

CROSS-REFERENCE TO RELATED APPLICATION

This application claims priority to U.S. provisional patent application Ser. No. 60/409,835 filed Sep. 11, 2002 by the same inventor and entitled "Automatic Menu Generator", the entire specification of which is incorporated herein by reference.

FIELD OF THE INVENTION

The present invention relates in general to systems and methods for enabling ordinary users of computers to generate their own menus, and in particular systems and methods for enabling ordinary users to create and update their own customized menu system which has a main menu and, if desired, multiple levels of submenus, each with multiple items, each with the ability to launch programs, automatically open selected files and/or execute certain commands associated with those launched programs.

DISCUSSION

Many operating systems and individual application programs that run on various computers provide menus in one form or another. The menus function as user interfaces that typically allow ordinary computer users to choose which program or operating system function they wish to invoke, on which file they wish to open, close or modify. The menu choices may also allow the user to initiate the execution of various background or system functions, some of which are or can be quite complex. These menu facilities in modern day applications are most frequently provided as icons or as lists of program or file names which initiate program execution typically, and the names or icons may be organized into directory (e.g., folder) listings placed or on toolbars if desired. The program names or icons are written as part of the application and normally cannot normally be changed at runtime. Further, these menu items invoke functions, but typically do not automatically perform multiple functions such as opening up a desired program and then opening a file or other object desired by the user to be used with that program. Also, the user typically cannot associate any custom function that he or she has selected with a particular icon, or a particular program to be opened.

Another shortcoming of many icon-based menu choice systems is that they do not in and of themselves facilitate the user developing nested submenus for invoking still other functions, or the updating of the submenus. In addition, there typically are no facilities for allowing the automatic merge and/or sorting of different icons and different menu items.

SUMMARY OF THE INVENTION

In light of the foregoing limitations associated with the known menu systems, and as part of the present invention, I have recognized it would be useful to have an easy and largely automatic way for an ordinary user to generate menus and submenus that allow a user to perform any executable "thing" by simply selecting a menu item. Any executable "thing" includes an operating system command, a command created by a user, an executable file that contains operating system commands, DBMS commands, hyperlinks to web sites or web pages, or user commands. It would also be useful to have these menus generated dynamically at runtime so that changes to program or file locations on the user's computer or on the user's computer network could be easily handled. It would also be useful to allow a user to create a new menu item or a submenu while using the program. Any executable thing is referred to here as a "command."

To overcome one or more of the foregoing limitations, there is provided, in accordance with a first aspect of the present invention, a menu generation system for use by ordinary computer users that enables the user to readily construct and modify menus and submenus to execute user-prepared commands. The system may comprise a program operable by an ordinary computer user to construct a viewable main menu with a plurality of user-defined choices thereon, and if desired at least a first viewable submenu which may be accessed by the user through a choice made on the main menu. This main program preferably includes a few different components, which may be written as parts of one large program, or may be subprograms or routines or objects called by the main program. These components will now be briefly summarized.

The first component is operable by an ordinary computer user to construct the viewable main menu. This component preferably automatically provides at least first, second and third user-selectable choices on the main menu. The first menu choice is for creating a new menu item on the main menu. The second menu choice is for creating a new submenu. the third menu choice is for quitting the current menu.

The second component is also operable by an ordinary computer user to modify the content of the main menu and the content of any submenus as a menu item. A third component may also be provided, and it too is operable by an ordinary computer user. Its purpose is to create a submenu, with one or more viewable indicators selectable by the user for selecting the respective menu items. A fourth component, also operable by an ordinary computer user, may be used as part of the menu generation system. Its purpose is to create and modify a plurality of storage locations used by the menu generation system for storing operating commands used by the menu generation system for launching other executable programs accessible to the computer user, and for storing data that is referenced as part of creating and displaying user-viewable menus.

In the menu generation system of the present invention, the fourth component is preferably operable to access at least a plurality of files normally stored in the storage locations. These files preferably include at least one command map file and at least one menu configuration file. The command map file is arranged to store a plurality of operating commands and a set of aliases used as an shortcut technique for referencing certain ones of the operating commands, as will be further explained below. The menu configuration file is arranged to store data that is referenced as part of the process of creating and displaying a menu. These and other aspects of the present invention, including the methods of the present invention, may be further understood by referring to the detailed description below, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIG. 7 is a diagram which helps illustrate the menu items which are displayed based upon the Menu Configuration File depicted in FIG. 6;

FIG. 12 is a diagram which shows how menu items are displayed to a user and how the user is given a choice to make a selection, as described in FIG. 6;

FIGS. 13, 14A and 14B are diagrams which respectively show the results of selecting a specific menu item listed in the menu shown in FIG. 12;

FIGS. 15 and 16 are diagrams that illustrate the results of selecting the "nmi" item (for "New Menu Item") in the menu described in FIG. 12;

FIG. 17 is a diagram which illustrates the new menu resulting from the updated Menu Configuration File displayed in FIG. 16;

FIG. 18 is a diagram which illustrates the results of selecting the "nsm" item (for "New SubMenu" item) which instructs the AutoGenMenu program to create a submenu;

DESCRIPTION OF THE PREFERRED EMBODIMENTS

The systems and methods of the present invention are illustrated and described herein in connection with certain embodiments, with the understanding that the present disclosure is to be considered as an exemplification of the various aspects and principles of the present invention and the associated functional specifications required for their implementation. However, it should be appreciated that the systems and methods of the present invention may be implemented in still different configurations, forms and variations, based on the teachings herein.

The systems and methods of the present invention typically may be used with and operate on and/or within a typical user's computer system. Such users may have any suitable computer system including a desktop computer, laptop or notebook computer, and/or a computer workstation, whether used in a standalone fashion or as part of a larger computer network. They may employ any suitable operating system (OS), such as but not limited to Unix, Linux, Microsoft (MS) Windows or MS-DOS, Apple DOS, and the MAC operating system for the Apple Macintosh computers. The systems and methods of the present invention may also be used in suitably powerful personal digital assistants (PDA) or other computerized personal devices, including communications devices, such as digital cell phones, and computerized data collection devices, such as handheld data input devices including mobile logging of data, such as those used in various industries for barcode scanning, inventory control and ordering, and the like. Such portable PDA devices employ their own "lighter-weight" operating systems such as but not limited to the Palm OS from Palm, Inc., Windows CE from Microsoft, and the EPOC OS from Symbian (formerly Psion) designed for "wireless information devices" such as small, portable computer-based telephones, which are now are providing with wireless access to phone and other information services, including short message services (SMS).

The systems and methods of the present invention include several programs or components of programs. It may be viewed as one large program with several smaller components depending upon how structured such component may run in a largely autonomous manner or may be more closely coupled or integrated with the other components.

Figure 1:
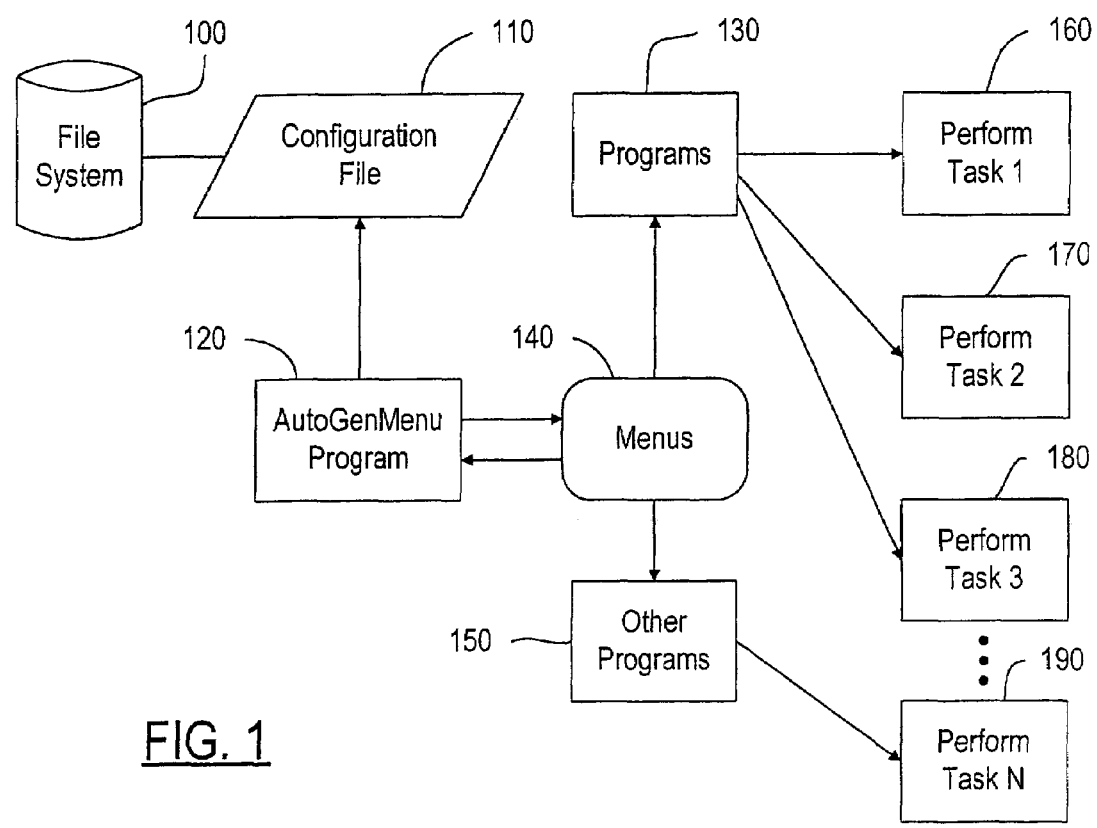
FIG. 1 is a simplified block diagram which provides an overview of the various steps of the AutoGenMenu system and processes of the present invention which creates and displays menus and allows a menu item to call the AutoGenMenu program itself to create and display a submenu.

FIG. 1 illustrates a computer environment in which the AutoGenMenu program of the present invention represented by box 120 will be run. The program starts by accessing the computer's file system 100 to retrieve and open a configuration file 110, which is the file the AutoGenMenu program uses to permanently store menu information. The AutoGenMenu Program 120 may also be permanently stored in the computer's file system or it may be stored on a storage media such as but not limited to a CD-ROM, DVD, floppy disk, external disk drive or a any suitable form of solid-state electronic memory such as battery-backed static RAM or flash memory.

Figure 2:
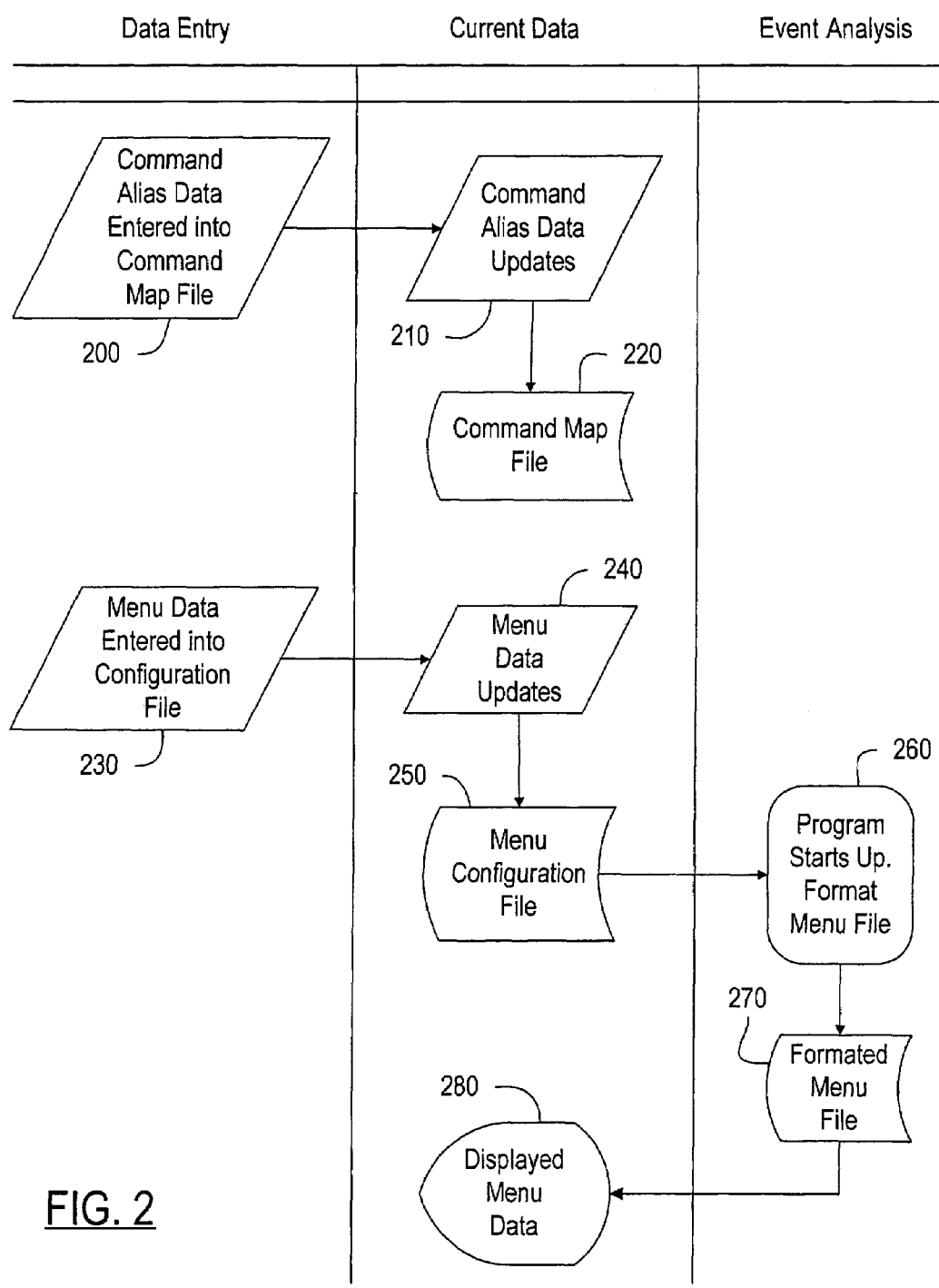
FIG. 2 is a high-level flow chart which illustrates the use of two types of files used by the system and method of the present invention, namely, a Command Map File and a Menu Configuration File, to store data that is referenced as part of the process of creating and displaying a menu.

FIG. 2 illustrates the creation and updating of the Command Map File and the Menu Configuration File. As shown in block 200, a command alias and its associated processing command are entered into a file called the Command Map File as shown in block 200. The Command Map File contains the mapping between each command alias and its associated command string. An alias is a notation that is typically shorter than the name of the associated command name and which uniquely identifies the command within the menu system of the present invention and thus can be used to refer to the command itself. An alias preferably consists of one letter or number, but may consist of one or more letters, one or more numbers or a mixture of both letters and numbers and even other allowed (i.e., no-reserved) characters within the current operating system. An alias is used to simplify the process of creating and updating the Menu Configuration File which is another file used by the Auto-GenMenu program. A command may be any executable computer program recognized by the operating system. An Internet browser program (e.g., iexplorer.exe) is also considered a command. For example, a command to run Microsoft's Excel Spreadsheet program is "excel.exe" and "e" could be used a the alias to reference "excel.exe" within the entire menu system of the present invention. If desired or necessary, the path name for the command may also be included as part of or in front of the command, such as "c:\program files\microsoft office\office\excel.exe."

Each line of the Command Map File 220 consists of an alias for a command ("command_alias" or "alias") which is associated with a specific processing command. The Command Map File preferably is of the format: command_alias command. If there is no value entered for the command_alias, then a full version of the command is used. Again, the path name may be included in this full version if desired or needed. As shown in block 210, the command alias data is updated by the AutoGenMenu program.

Figures 3, 4:
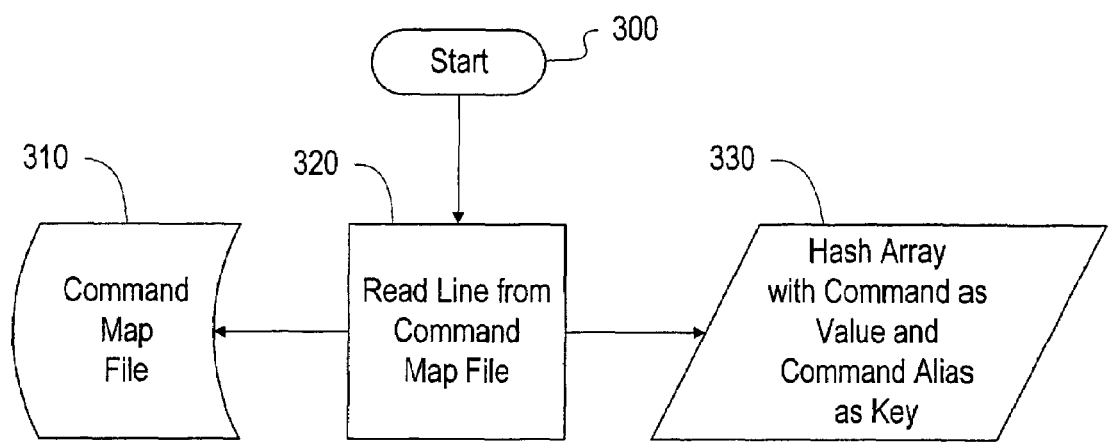
FIG. 3 is a flow chart which helps illustrate the steps in reading of a Command Map File and storing command strings in a hash array.
FIG. 4 is a diagram which shows an exemplary organization of the hash array as a table.

FIG. 3 illustrates the Create Command Array (CCA) Procedure which creates and updates the Command Map File. This procedure, as well as the other procedures mentioned herein, may each be written as a small but integral section of the software code in the overall AutoGenMenu program, or it may be written in other ways such as a routine or component that is called as needed by the AutoGenMenu program. To update the command alias data, the CCA procedure first reads a line of the Command Map File as shown in block 320. After reading a line from the Command Map File, the AutoGenMenu program creates a hash array ("cmdArray") where the command-alias is the key and the command is the value as shown in block 330. Thus, this hash array is stored in the computer memory to be referenced by the AutoGenMenu program dynamically. The entire Command Map File is read in this manner. The Command Map File is preferably stored within the computer's memory such as on a hard disk or a solid-state mass storage device but it can be stored on some other type of memory device such as a CD-Rom, DVD or floppy disk, if desired.

In order to automatically generate menus, the AutoGenMenu program also uses menu data that has been entered into the Menu Configuration File 250. This file is also preferably stored in the computer's memory such as on a hard disk or a solid-state mass storage memory but it can be stored on some other type of memory device such as a CD-ROM, DVD or floppy disk or external disk drive, if desired. Each time the AutoGenMenu program executes, it updates the menu data stored in the Menu Configuration Files as shown in block 240.

Figures 5, 6:
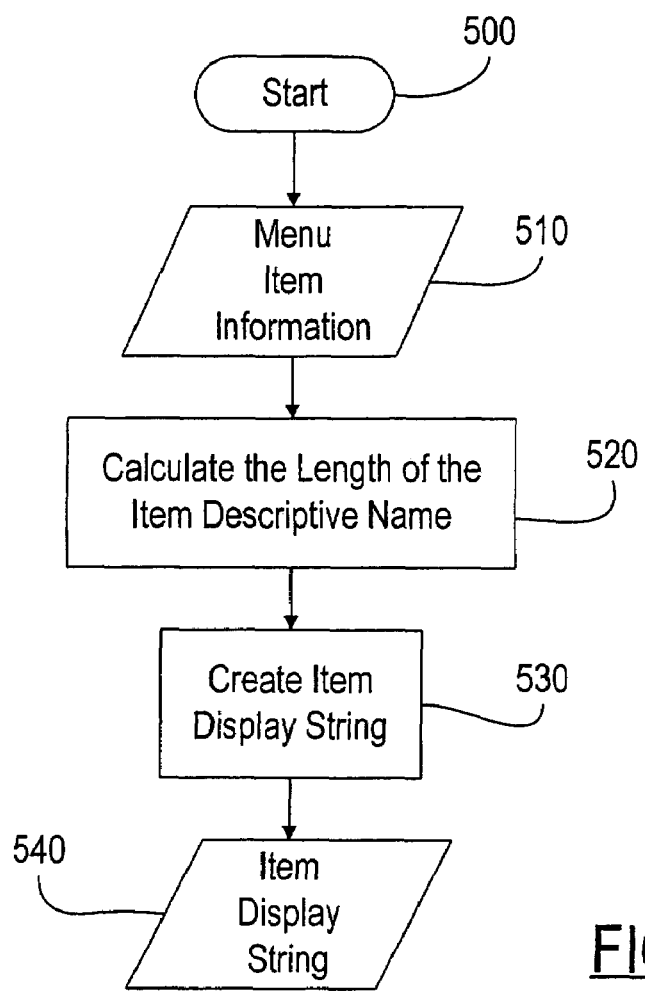
FIG. 5 is a flow chart which illustrates a process for displaying each menu item in such a manner that it is properly aligned with the other menu items.
FIG. 6 provides an example of the organization of the Menu Configuration File which is permanently stored as a file on some type of storage device.
Figures 12, 13:
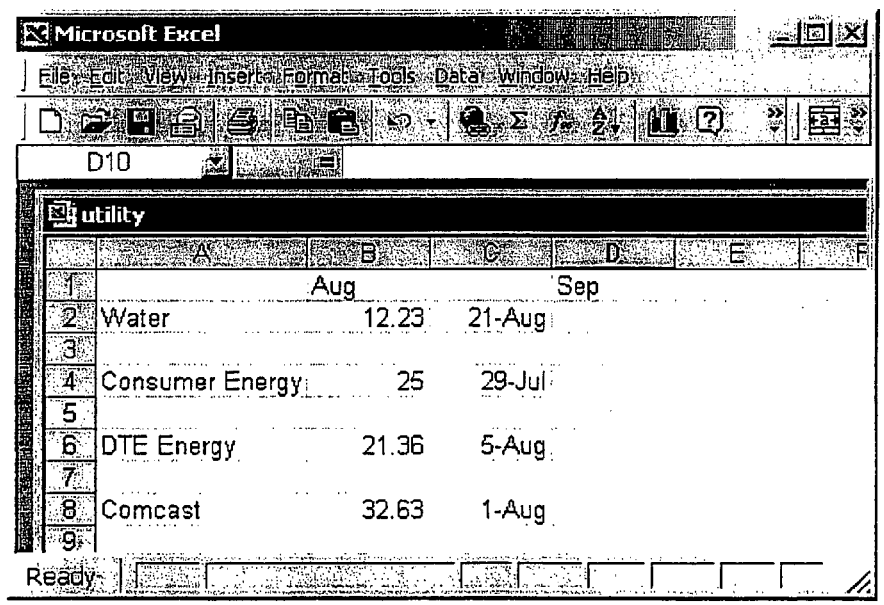
Figures 19, 20:
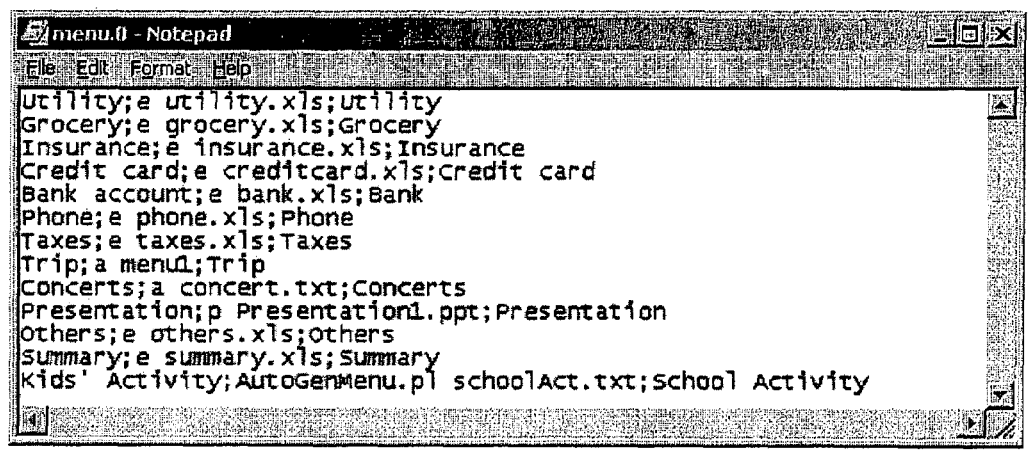
FIG. 19 is a diagram which illustrates how a user updated the original Menu Configuration File described in connection with FIG. 16.
FIG. 20 is a diagram which displays the new menu created as the result of editing the Menu Configuration File displayed in FIG. 19.

FIG. 6 shows an exemplary organization for the Menu Configuration File, which is preferably permanently stored as a file on some type of storage device. As shown in FIG. 6, each line of the Menu Configuration File contains three fields. Each of these fields should be separated or set off by a character that is not likely to appear in the menu item strings or the command strings such as a punctuation mark. In the preferred embodiment of this invention, a semicolon is used as the separator that separates these three fields. The first field contains a descriptive name for the menu item. The item descriptive name is the name that will be displayed in the menu, as shown in FIG. 12. The second field contains the alias of the command and the name of a file or other object that will be operated upon by the command. The second field contains the full command itself if no alias for the command is defined in the command file. The term "processing command" is often used herein to refer to the combination of a command and the filename for the file or the name for the object upon which the command operates. The third field contains a link item description or an item link name. If the second field contains the value "AutoGenMenu.pl," or its alias "a," then the link name description contained in the third field is displayed at the top of the new menu generated by the tool. Otherwise, the name displayed at the top of menu is "main." FIGS. 12, 17, and 20 illustrate the display of "main" and FIG. 14A illustrates the display of the link name description that identifies a submenu.

FIG. 2 helps illustrate the global process or procedure of updating the menu data 240 to form The Menu Configuration File 250. FIG. 5 helps illustrate the steps involved in this updating process. This Menu Date Update Procedure begins at block 500. At block 510, the procedure reads the menu item information from the menu item configuration data file 250. As each menu item is read, it is given an item number that corresponds to the order in which the menu item was read. The process creates a new string that represents the menu item descriptive name by adding the menu item number and a right parenthesis and a space to the beginning of the menu item descriptive name.

When displayed, menu items are preferably aligned with one another. In order to properly align menu items whose descriptive names vary in length, the program executes a procedure called the Padding Procedure to pad the menu items with blank characters. The Padding procedure calculates the length of each item descriptive name as shown in block 520. The next step, as shown in block 530, is to create an item display string which will be displayed to the user as the menu item. Using a preset field length, the Padding Procedure computes the number of characters that must be added to the menu descriptive item so that its length will equal the preset field length. Although any character can be used for this purpose, it is preferable to use either blanks or other nonprintable (i.e., nondisplayable) characters. The item display string that is created will be of the format: item number, right parenthesis, space, menu descriptive name and padding characters. At box 540 of FIG. 5, the item display string created in step 530 is assigned as a value to a global variable that is later accessed by a create menu procedure. FIG. 7 illustrates the item displaying strings that are associated with the menu configuration file as shown in FIG. 6.

Figure 8:
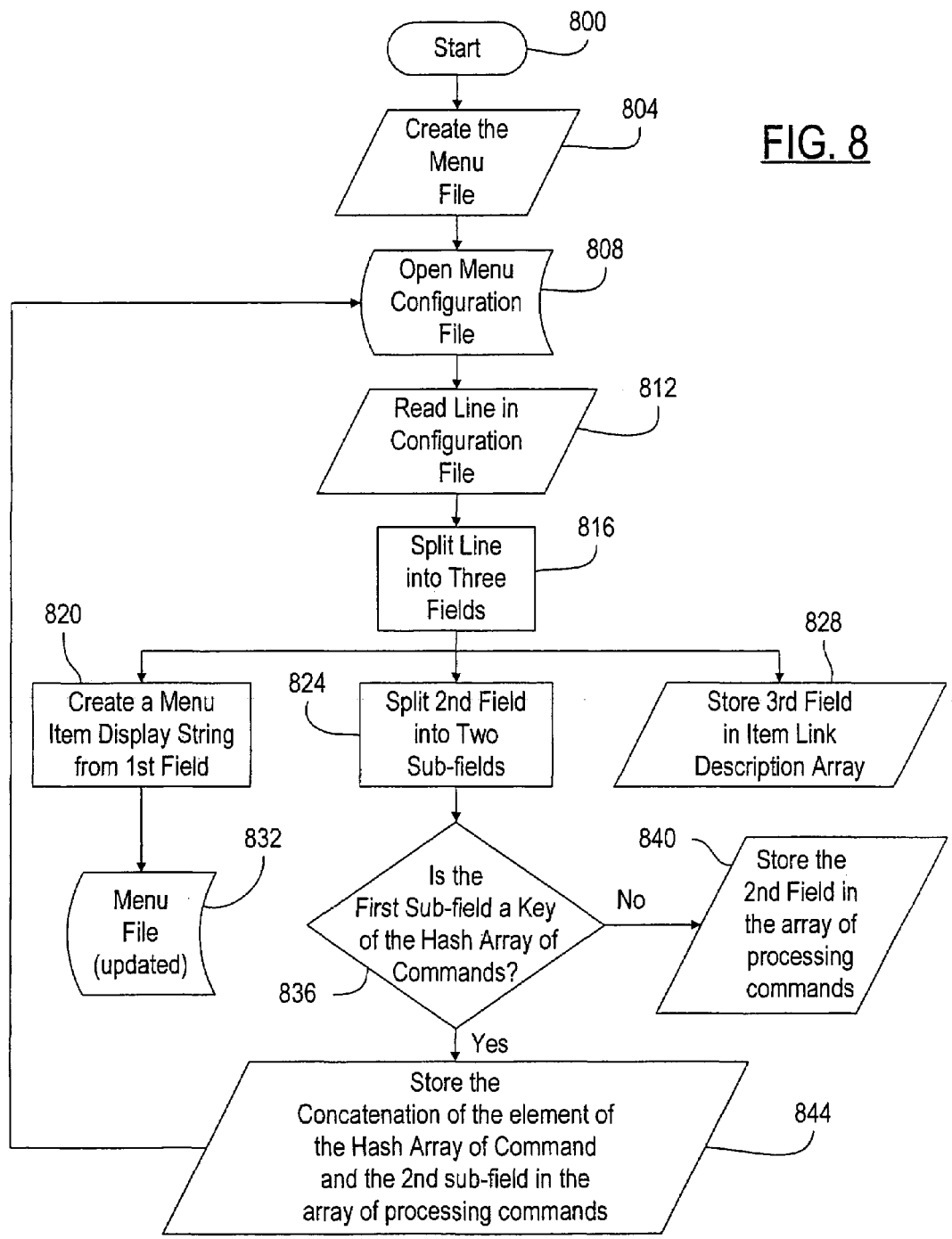
FIG. 8 is a flow chart which illustrates the steps in generating a data structure which is used in displaying a menu.

FIG. 8 is a flow chart that helps illustrate how each line of the Menu Configuration File is interpreted by a procedure called the Create Menu Items Procedure and how the contents of the Menu Configuration File are used to generate menus. As shown in blocks 800 and 804, the first step in the process of interpreting the Menu Configuration File is to create the menu file name associated with the configuration file name. The input data to the Create Menu Items procedure is taken from the Menu Configuration File as shown in block 808. The procedure opens the Menu Configuration File and reads a line from the Menu Configuration File as shown in block 812 and then splits the line into three fields using the separator to demarcate each of the fields as shown in block 816. The value in the first field is used to create a menu item display string as shown in block 820. The Padding Procedure is invoked to create this menu item display string from the value in the first field The new menu item is appended to the Menu Item File as shown in block 832. In some cases, prior to storing the value, the Create Menu Items Procedure will append a new line character to the displaying string that is stored. As the Create Menu Items Procedure reads each line from the menu configuration file, it also updates a counter. When this counter reaches a present number, which allows a fixed number of menu items to be displayed per line, a new line character is appended to the displaying string. Thus, a set number of menu items will be displayed per line.

The value in the second field is split into two separate sub-fields as shown in block 824. The first sub-field is checked to see whether it is a key for the hash array of commands. As shown in decision block 836, if the first-subfield has an element value associated with it, this value is treated as a key and the corresponding hash array element associated with this key is concatenated with the second sub-field, which contains the command argument, and then stored in the array of processing commands as shown in box 844. Additionally, an index is used to identify the position within the array in which the second field will be stored. If the first-subfield does not have an element value associated with it, then the second field is stored in the array of processing commands as shown in block 840. In addition, an index is used to identify the position within the array in which the second field will be stored.

The third field is stored in the item link description array as shown in block 828. The procedure then creates a new menu item displaying field from the first field by padding blanks using the procedure described in FIG. 5. The new menu item is appended to the menu field as shown in block 832.

Figure 11A:
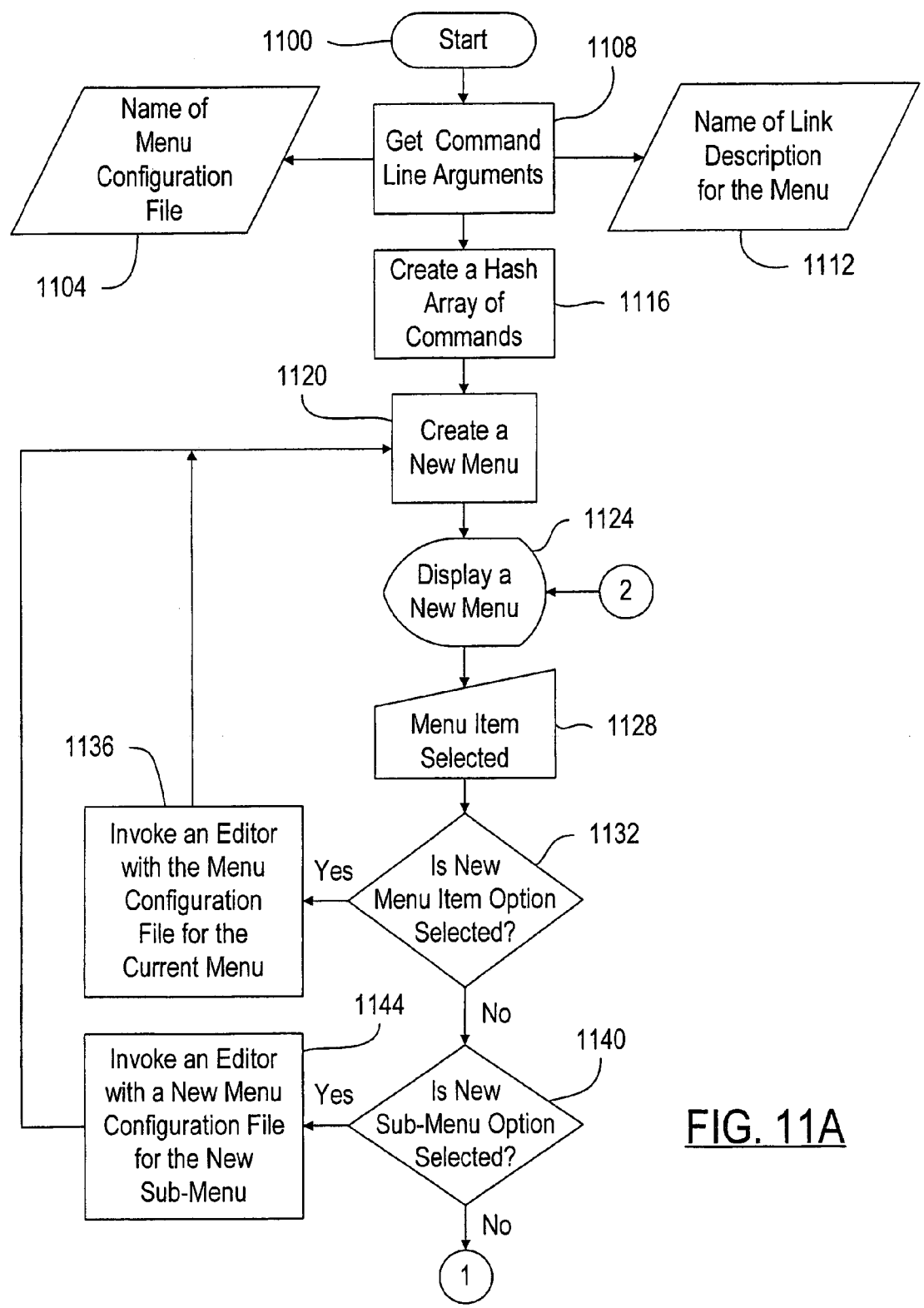
FIG. 11 (comprised of FIGS. 11A and 11B) is a flow chart which illustrates the Driver Procedure that is part of the AutoGenMenu Program.
Figure 11B:
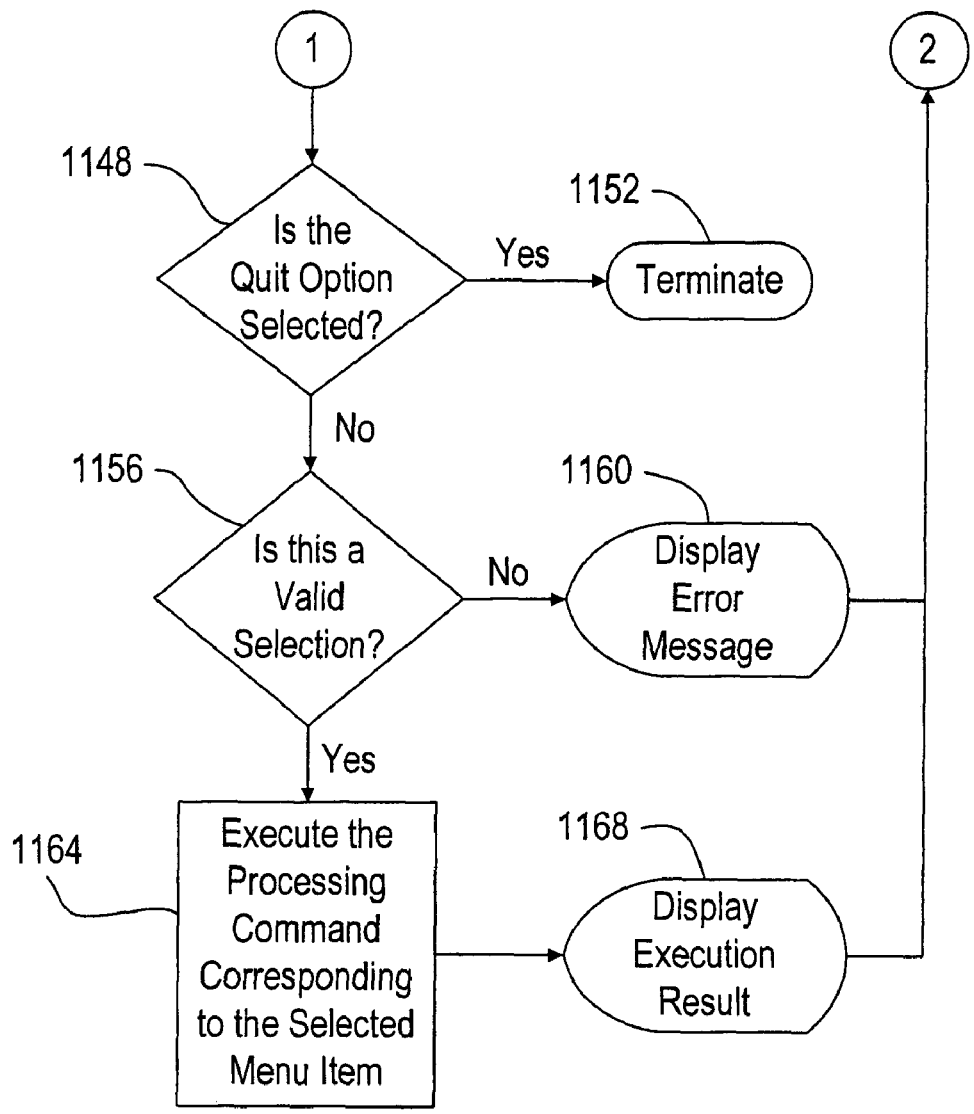

Then the Create Menu Items Procedure automatically appends three additional menu items to the menu file. These menu items will, as shown the exemplary displayed menu in FIG. 12, be presented as choices in that displayed menu for the user to select if he or she desires when making use of the AutoGenMenu system. The first item is "nmi" which allows the user to create a new menu item within the currently displayed menu at runtime. The next time this menu is displayed, the descriptive name the user gave to the newly created menu item will be displayed as part of the menu. The second item is "nsm" which allows the user to create a new submenu at runtime. To create a new submenu, the user is prompted to enter a descriptive name for the new submenu and the name of the configuration file for this submenu. The descriptive name for this submenu is included in the menu at this level the next time this menu is displayed. The third item is "q" which allows the user to exit the submenu at the current level and return to the submenu at the previous level. If the submenu is the main menu, then the user exits the command that implements the Driver procedure described in FIG. 11.

Figures 9, 10:
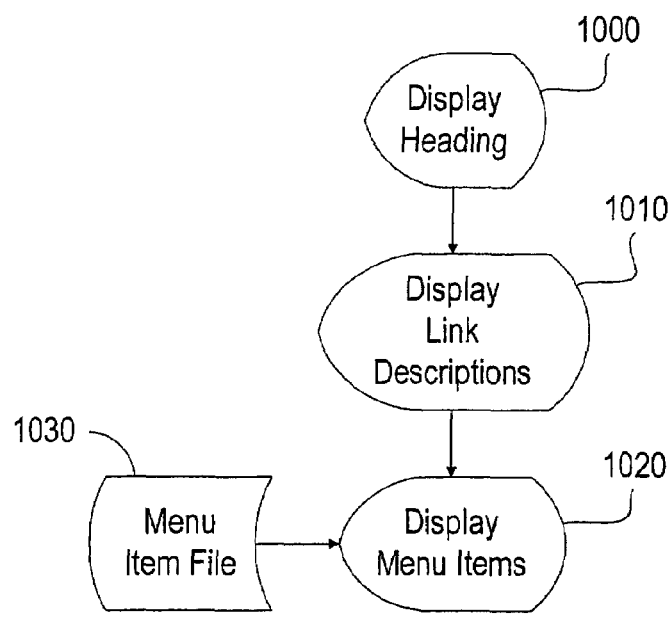
FIG. 9 is a diagram which depicts the processing commands generated from the Menu Configuration File described in FIG. 6.
FIG. 10 is a flow chart which illustrates the steps in processing the Menu Item File.

An example of the processing command array that is created by the Create Menu Items Procedure is given in FIG. 9. Each row in the array contains an index and an element of the processing command array that is associated with that index.

The Display Menu Procedure, described in FIG. 10, displays the menu items that are contained in the menu items file that was created or updated by the Create Menu Items Procedure. The first step in displaying a menu is to display the heading associated with the menu as shown in block 1000. For example, the phrase "Automatically Generated Menu" is the heading for the menu depicted in FIG. 12. Then the Display Menu Procedure displays the link descriptions as shown in block 1010. These link descriptions replicate the tree structure of the menu by displaying each node along the path from the parent menu to each submenu. In FIG. 12, "main" is the link description that is displayed. Then the menu items contained in the menu item file 1030 are displayed as indicated in block 1020.

The Driver Procedure performs initiation functions. It calls the Create Command Array procedure, the Padding Procedure, Create Menu Items procedure and the Display Menu Procedure. As shown by blocks 1100 and 1108, the Driver Procedure begins by reading the command line arguments. These arguments contain the name of the Menu Configuration File, as shown in block 1104, and the name of the link description for the menu as shown in block 1112. These arguments are entered by the user. Then the Driver invokes the Create Command Array procedure to create a hash array of commands as shown in block 1116. A new menu is then created as stated in block 1120 by calling the Create Command Array procedure, the Padding Procedure and the Create Menu Items Procedure. After the new menu is created, the Driver invokes the Display Menu Procedure to display the new menu as indicated in block 1124.

The user then selects a menu item as shown in block 1128. The user can make such a selection by entering the number corresponding to the menu item from the keyboard. If a valid menu item has been selected, as shown in decision box 1156, the Driver executes the processing command corresponding to the selected menu item as shown in block 1164. If the selection is not a valid selection then the Driver displays an error message as shown in block 1160 and the menu is displayed again. In this case, it is not necessary to create the menu anew. An invalid command would be entered, for instance, if the user pressed only the enter key or return key. Although this embodiment of the invention contemplates having the user enter information from the keyboard, the input means is not limited to a keyboard. The user could also use a mouse to highlight and select a menu item. The present invention can also be implemented on a web page on which the menu items are displayed as hyperlinks.

The menu is dynamically modifiable through the selection of a new menu item by the user as shown in block 1132 or the selection of a new submenu item as shown in block 1140. If the user selects the new menu item option, then the Driver invokes an editor with a copy of the configuration file. The user, using this editor, modifies the menu configuration file for the current menu as shown in block 1136. For example, the user adds a new menu item and its corresponding processing command and link description. The user then saves the changes and exists the editor. The Driver then re-reads the modified configuration file, as shown in block 1120, and displays the new menu as shown in block 1124. The editor is any standard text editor provided by the operating system. For instance, in a Windows operating system, notepad would be used as the editor.

If the user selects the "new submenu" or "nsm" menu item, as shown in decision block 1140, the Driver enables the user to dynamically create a new configuration file for this submenu and update the configuration file for the parent menu with a reference to this submenu as show in block 1144. If the user selects create a new submenu option, then the Driver invokes an editor with a new menu configuration file to create the new submenu as shown in block 1144. The user is prompted to enter the name of the submenu. The Driver automatically updates the current configuration file for the parent menu with a reference to the configuration file containing the submenu information and the associated processing command. The alias of the processing command corresponds to the command that implements this Driver Procedure. After adding the submenu information to the configuration file for the parent, the Driver invokes the editor to display the modified configuration file for the parent menu. The Driver prompts the user to confirm that the newly appended line in the configuration file for the parent menu is correct. After the user exits the editor, as shown in block 1120, the Driver creates a new menu which includes the submenu as one of the menu items. Then this new menu is displayed as shown in block 1124.

If the user wishes to quit, then the user selects the quit option. If the quit option is selected, then the Driver terminates as shown in blocks 1148 and 1152. As shown in block 1156, if the user selects a valid processing command, other than the quit, new menu, or new sub-menu options, then the Driver checks to determine whether the corresponding processing command is the command that implements or calls the Driver Procedure. If it is, then it generates and displays a submenu; the item link description is appended to the item link description of the invoking command that implements the Driver Procedure. Modern computer languages have the capability to allow a procedure to invoke itself. If the corresponding processing command is not the command that implements the Driver Procedure, then simply execute the command as shown in block 1164. The result of executing this processing command is then displayed as shown in block 1168.

After displaying the result of executing the processing command associated with the selected menu item the Display Menu procedure is invoked and a new menu is again displayed to the user as shown in block 1124. The Driver continues to display menus to the user and allow the user to select menu items, until the user selects the quit option in the menu as shown in blocks 1148 and 1152. The name of the link description for the menu is read by the procedure as shown in block 1112.

FIG. 12 illustrates an example of a menu that would be displayed by the Driver. When a user selects one of the numbered items listed in the menu in FIG. 12, the processing command associated with that numbered item, as shown in FIG. 9, is executed by the Driver. For example, if the user selected "0", then the Driver would invoke excel.exe (the command to execute the Excel spreadsheet program), to open the file utility.xls, the results of which are shown in FIG. 13. If the user selected "6", then the Driver would invoke the command associated with index 6 in the array shown in FIG. 9. Since this processing command is "autoGenMenu.exe menu1," the Driver would invoke itself and create a new submenu based on the configuration file named "menu1." If the file menu1 contained "Trip 1; w trip1.doc; Trip" as the first line and "Trip 2; w trip2.doc; Trip" as the second line, then the Driver would display the submenu depicted in FIG. 14a. If the user chooses "0" from this submenu, then the Driver invokes the windword.exe program to open the file trip1.doc to edit as shown in FIG. 14b. If the user choose "q", the Driver redisplays the main menu or parent menu shown in FIG. 12.

When the user chooses "nmi" the Driver invokes the Windows notepad.exe editor to open the configuration file to edit as shown in FIG. 15. The user then adds a line describing the new configuration for the new menu item. For example, "Grocery; e grocery.xls; Grocery" as shown in FIG. 16. After the user exits from notepad, the Driver rereads the configuration file and displays the updated menu with the addition of the Grocery menu items as shown in FIG. 17.

To create a submenu, the user enters the name of the configuration file and also enters the menu description and the link name of the submenu. If the user chooses to add a new submenu by selecting "nsm", the Driver prompts the user to enter the name of the configuration file for this new submenu. After the user enters it, the Driver invokes notepad.exe editor to open the configuration file for editing. For example, if the user enters "schoolAct.text" as the name of the configuration file, the notepad.exe editor opens this file. The user would then enter the appropriate lines into the schoolAct file. FIG. 18 shows examples of lines that a user might enter. When a submenu is created, the user also provides a short description and a link name. The Driver opens the main menu as shown in FIG. 19 and modifies it by appending a line to the end of the configuration file associated with the main menu. FIG. 19 shows the modification that is made in the configuration file when "Kid's Activity" is used as the description and "schoolActivity" is used as the link. FIG. 20 shows the menu that is displayed the next time the configuration file is read.

As an example of the utility of the system of the present invention, consider the following. A user-viewable menu may be set up as web page, so that it can be read with any Internet browser. In this arrangement, each menu item may be hyperlinked to a destination of interest, such as website's home page, or an internal web page within a particular web site, a file, a document, part of a document, and the like. In other words, each menu item is set up so that its operating command (or a portion thereof) is a hyperlink to the desired destination. Similarly, each submenu item may be or contain or point to a hyperlink which, when selected, takes the user to the desired destination or more accurately stated, retrieves the web page, file or document of interest.

There is also an Activity Tracking Program ("AT Program") that is part of the system and methods of the present invention. In the preferred embodiment of the AT Program, the program tracks a user's activities on creating and updating text files in various directories of the operating system. These text files may be used to log the user's work status or work data collected by the user. As part of the tracking process, the AT Program creates or updates a menu configuration file of the type that can be used by the AutoGenMenu Program. The AutoGenMenu Program is then invoked by the AT Program and used to generate menus so that the user may peruse the created or updated text files. The AT Program also contains procedures that allow the users to merge various directories. The AutoGenMenu Program is invoked to generate merged menus. The AT Program uses two different files for tracking work activity. One file is a local activity summary file which is unique to a particular directory. The other file is a global activity tracking file which is unique to the operating system. For an implementation of the invention in a Relational Database Management System (RDBMS), these data are kept in two tables, a local activity summary table and a global activity summary table.

Figure 21:
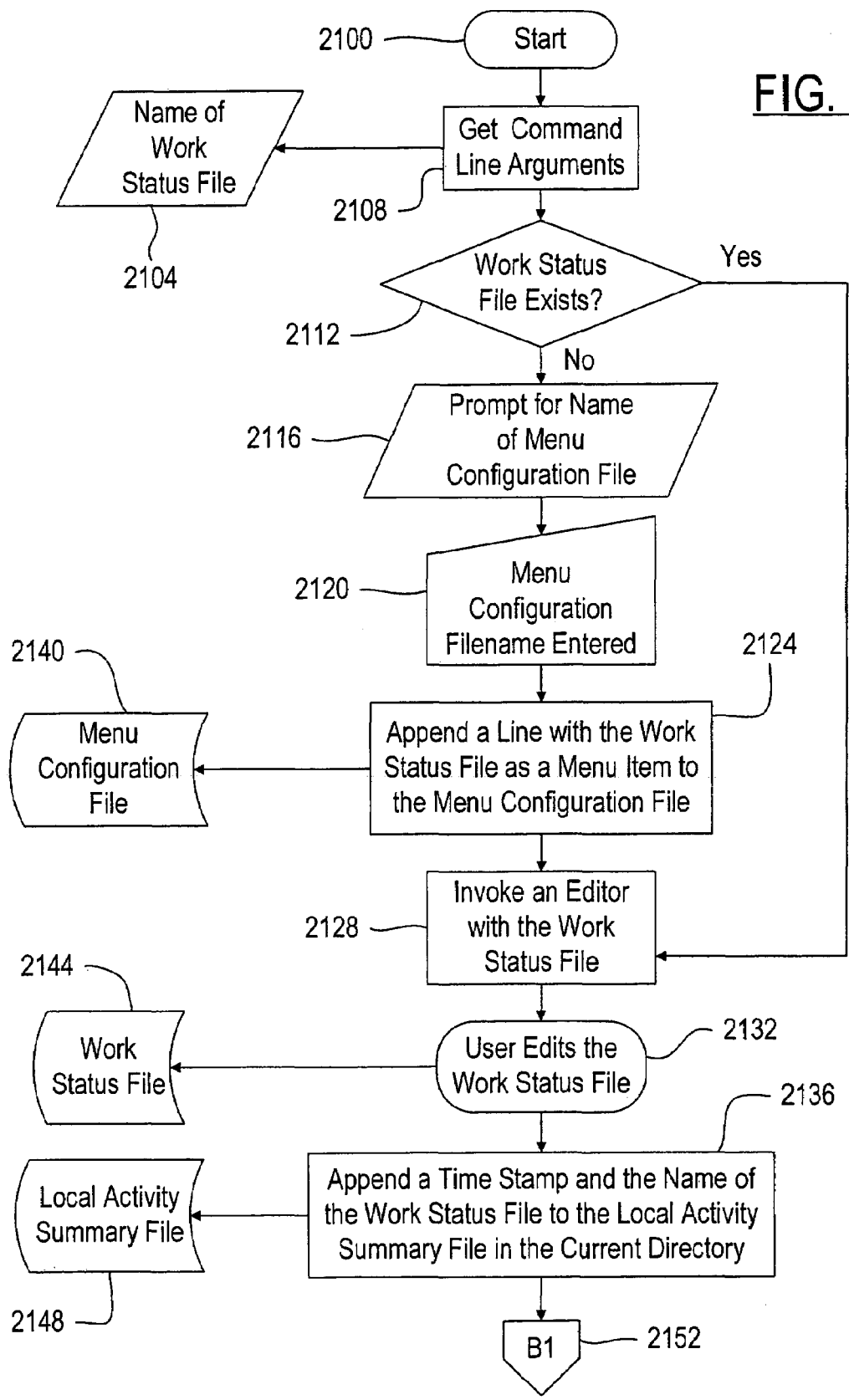
FIGS. 21 and 22 are flow charts which describe the steps in creating and updating a work status file, adding a new entry to a Menu Configuration File, updating the local activity summary file and updating the global activity summary file.

FIG. 21 is a flowchart that illustrates the steps involved in tracking a user's activity. As shown in blocks 2100, the AT Program starts by obtaining the name of the work status file, as shown in block 2104, from the command line that invokes the AT Program, as shown in block 2108. As shown in decision box 2112, the AT Program determines whether the work status file exists. If it does exist, then the AT Program invokes an appropriate editor such as notepad.exe to edit the work status file as shown in box 2128. If a work status file does not exist, then the program prompts the user for the name of a menu configuration file as shown in block 2116. After the name of the menu configuration file is entered, as shown in block 2120, the program appends a line to the menu configuration file as shown in block 2124. The line that is appended contains the filename for the work status file as the descriptive name for the menu item. The menu configuration file is saved as shown in block 2140.

Now that a work status file exists, the AT Program invokes the editor with the work status file as shown in block 2128. The user edits the work status file with work data as shown in block 2132. The work status file is saved as shown in block 2144. Then the AT Program appends a time stamp and the name of the work status file to the local activity summary file in the current directory as shown in block 2136. The local activity file is then saved as shown in block 2148.

Figure 22:
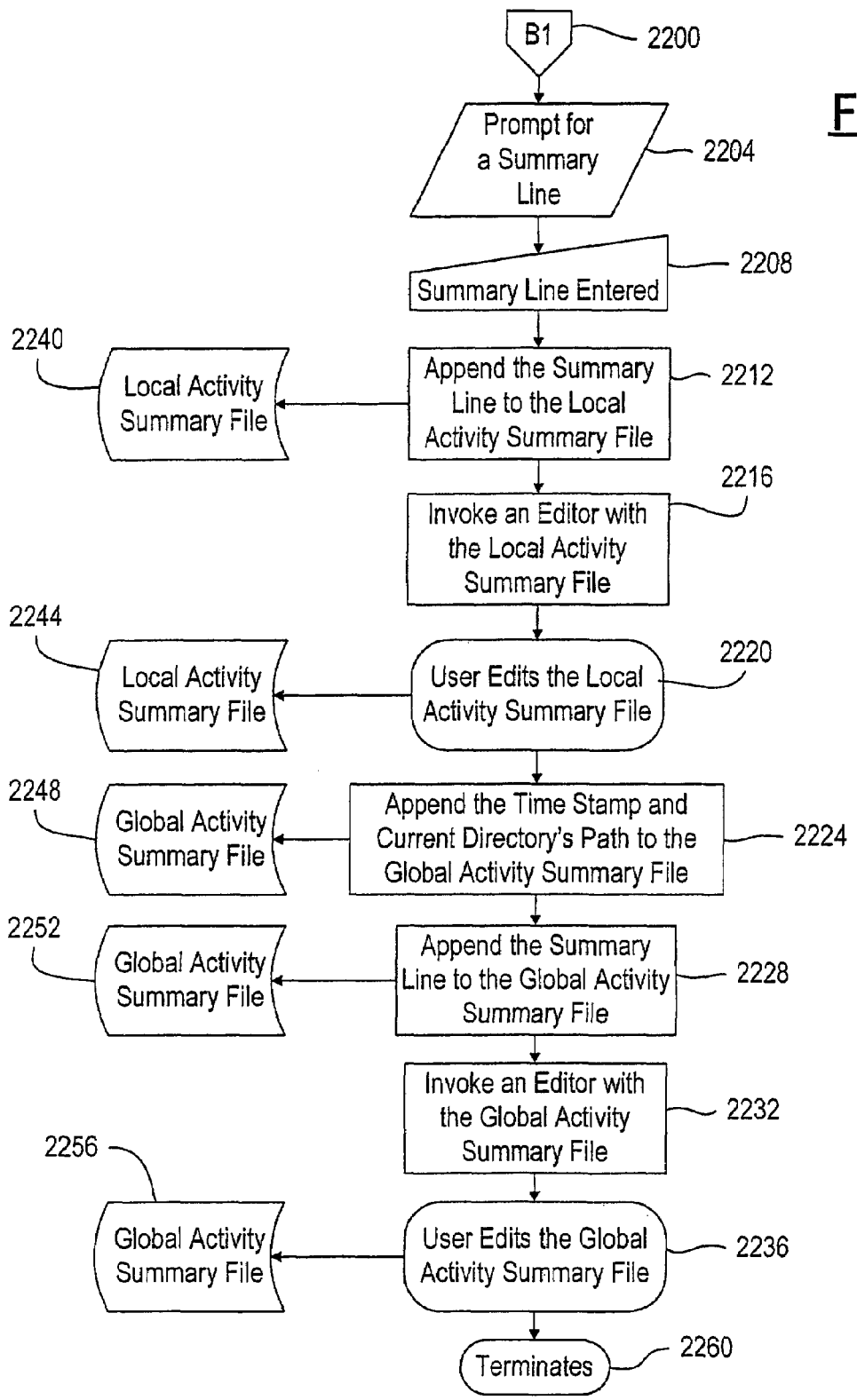

Next, the user is prompted to enter a summary line about the creation or update of the work status file as shown in block 2204. The user enters such a summary line as shown in block 2204 of FIG. 22. Then the AT Program, as shown in block 2212, appends the summary line to the local activity summary file and saves the file as shown in block 2240. The AT Program then invokes an editor with the local activity summary file as shown in block 2220. The user then edits the local activity file and, when the editing is finished, saves the file as shown in block 2244. After the local activity file has been edited and saved, the AT Program then appends the time stamp and current directory's path to the global activity summary file as shown in block 2224 and saves the edited file as shown in block 2248. The AT Program then appends the summary line to the global activity summary file as shown in block 2228 and saves the global activity summary file. Then, as shown in block 2232, the program, invokes an editor with the global activity summary file. The user edits the global activity summary file as shown in block 2236. The global activity summary file is saved as shown in block 2256 and the program exits as shown in block 2260.

Figure 23:
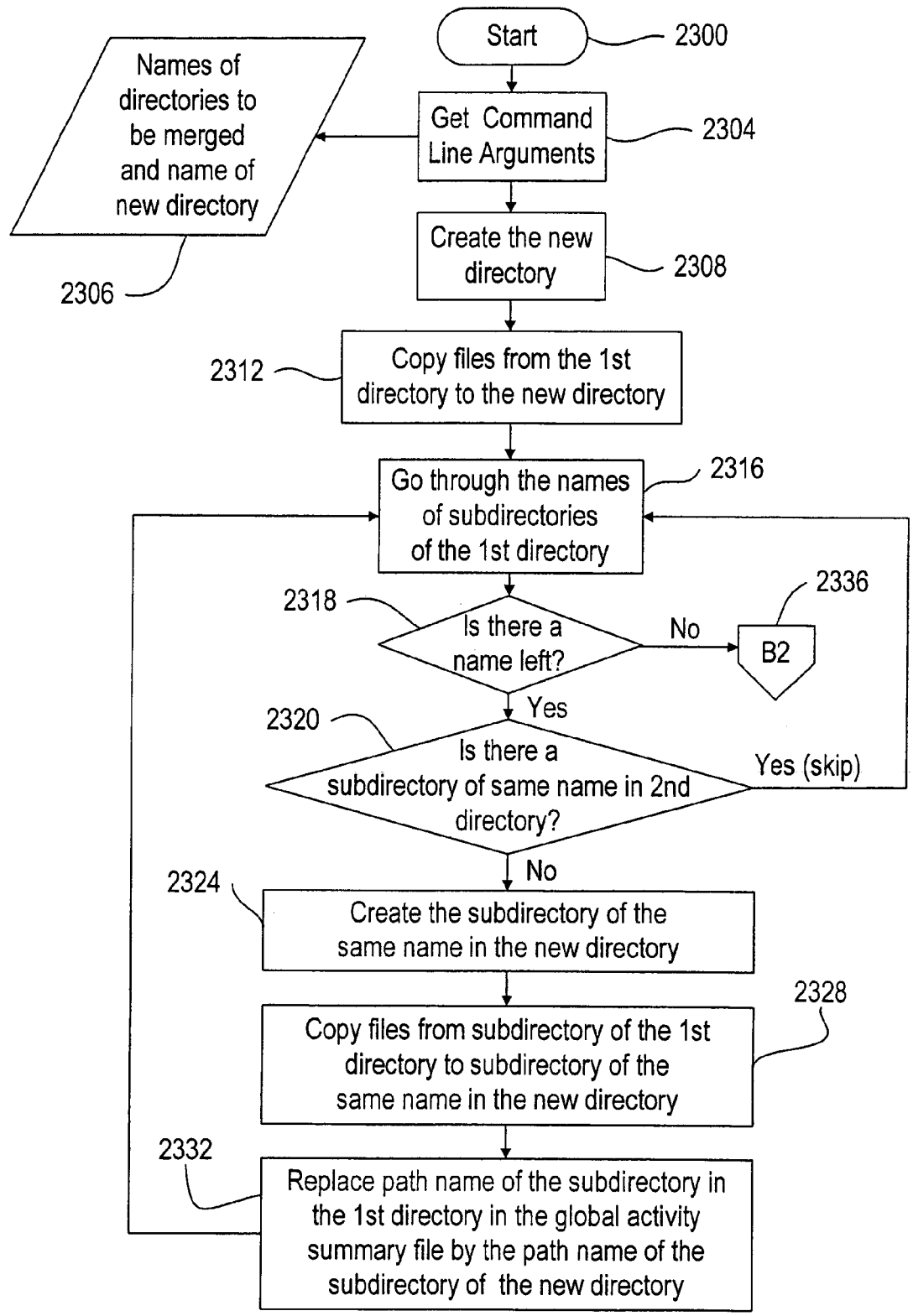
FIGS. 23, 24 and 25 are flow charts which describe the steps in merging two directories containing therein work status file and menu configuration files and how to update the global activity summary file to reflect this merging activity.

FIG. 23 illustrates the steps in merging directories and menu configuration files. The Merge Program begins, as shown in block 2300, by obtaining the names of the two directories to be merged and the name of the new directory to be formed, as shown in block 2306, from the command line arguments as shown in block 2304.

The Merge Program then creates the new directory as shown in block 2308. The files from the first directory are copied into the new directory as shown in block 2312. Then the Merge Program goes through the names of all of the subdirectories of the first directory, as shown in block 2316, comparing the names to the names of subdirectories in the second directory. If there is a subdirectory of the same name in the second directory, as shown in decision box 2320, the program continues by skipping this subdirectory and getting the name of the next subdirectory.

Figure 24:
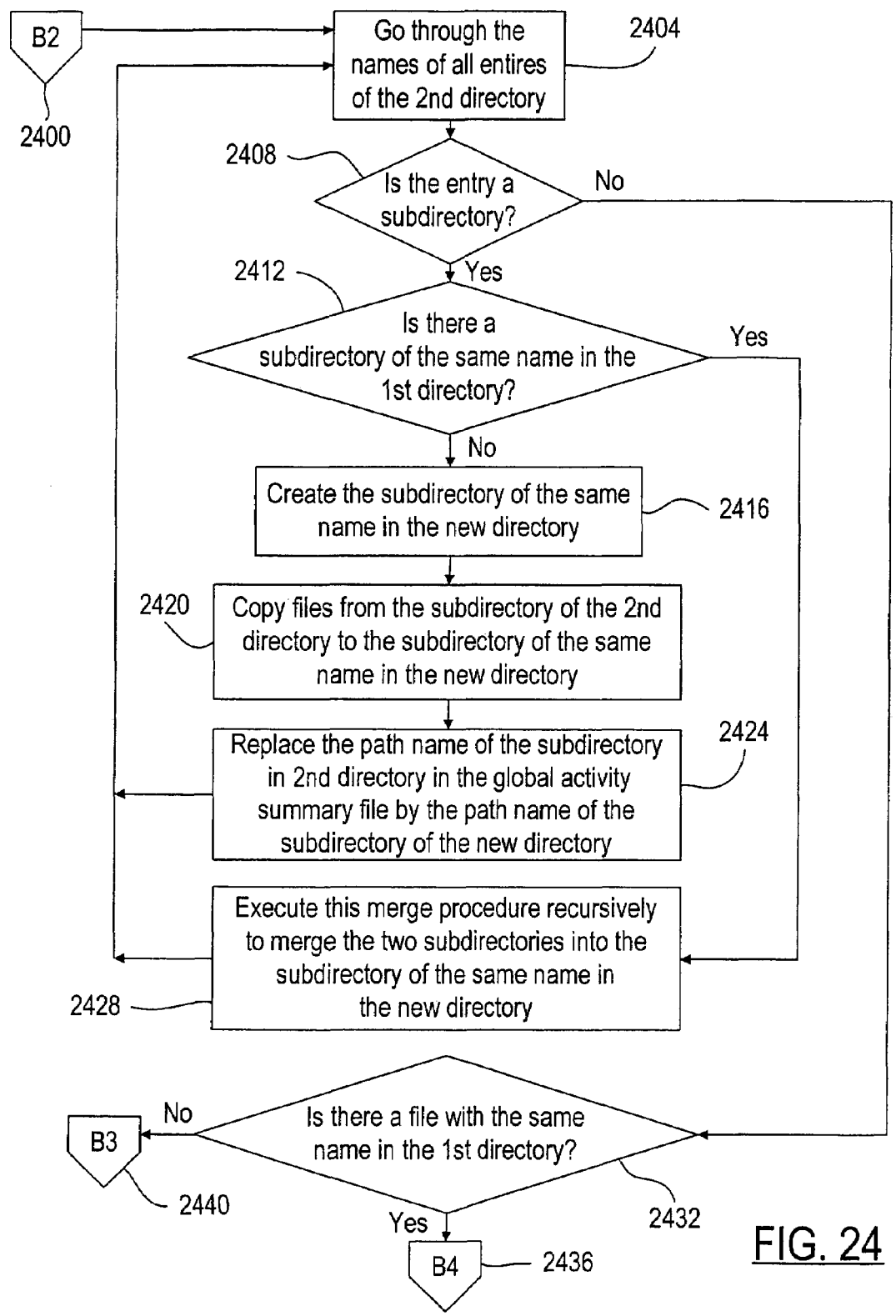

If the subdirectory name is unique, then the Merge Program creates a subdirectory of the same name in the new directory, as shown in block 2324. All entries within this subdirectory, including files and other subdirectories, are then copied from the subdirectory of the first directory into the subdirectory of the same name in the new directory as shown in block 2328. The Merge Program then appropriately updates the global activity summary file by replacing the path name of the subdirectory in the first directory in the global activity summary file by the path name of the subdirectory of the new directory, as shown in block 2332. The steps described in blocks 2316 through 2332 are repeated until all names of subdirectories have been processed. Then the Merge Program executes procedures on the names of entries in the second directory as shown in block 2404 of FIG. 24.

Figure 25:
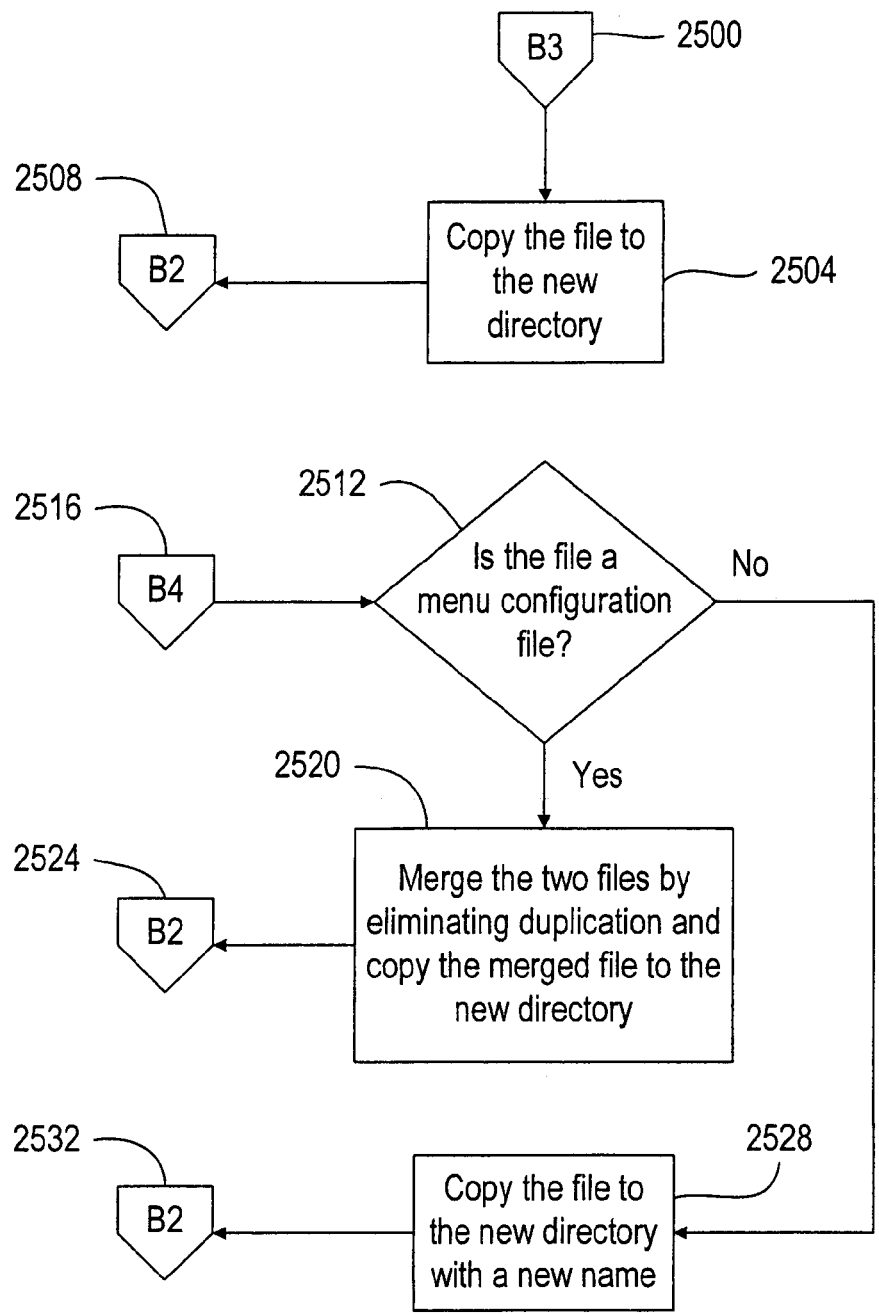

The Merge Program will perform a series of operations on each entry in the second directory as shown in block 2404. The first step is to determine whether the entry is a subdirectory, as shown in decision box 2408. If the entry is not a subdirectory, then the entry is a filename and the Merge Program determines whether this filename is unique or whether there is a file with the same name in the first directory as shown in decision box 2432. If there is not a file with the same name in the first directory, then the Merge Program copies the file to the new directory as shown in block 2504 of FIG. 25. After the file has been copied, as shown in block 2508 of FIG. 25, the Merge Program processes the next entry in the second directory. As shown in block 2436 of FIG. 24 and block 2516 of FIG. 25, if there is a filename with the same name in the first directory, the Merge Program determines whether the file is a menu configuration file, as shown in decision box 2512. If the file is a menu configuration file, then the two menu configuration files are merged after duplication entries are eliminated and then the merged file is copied to a new directory as shown in block 2520. Otherwise the file is copies to the new directory with a new name as shown in block 2528.

If the entry is a subdirectory instead of a filename, then the Merge Program determines whether there is a subdirectory of the same name in the first directory, as shown in decision box 2412. If the subdirectory name is unique to the second directory, then the Merge Program creates a subdirectory of the same name in the new directory, as shown in block 2416. Then the files in the subdirectory in the second directory are copied to the subdirectory of the same name in the new directory as shown in block 2420. Next, the path name of the subdirectory of the second directory in the global activity summary file is replaced by the path name of the subdirectory of the new directory as shown in block 2424. The Merge Program then processes the next entry in the second directory as shown in block 2404.

When the subdirectory name is not unique (i.e., the same name is used for a subdirectory in the first directory and for a subdirectory in the second directory), then the Merge Program merges the two subdirectories into the subdirectory of the same name in the new directory by invoking itself as shown in block 2428.

The Search Program searches for strings in a given configuration file from a file. It prints out the lines that contain at least one of the searched strings. For these output lines, any searched string that is found is enclosed with HTML hyper-link tags that link to the line where the string first occurs. If such a line contains a description or definition of the string, then the hyper-link points to the origin of the string. The operations performed by the Search Program are described in FIG. 26.

Figure 26:
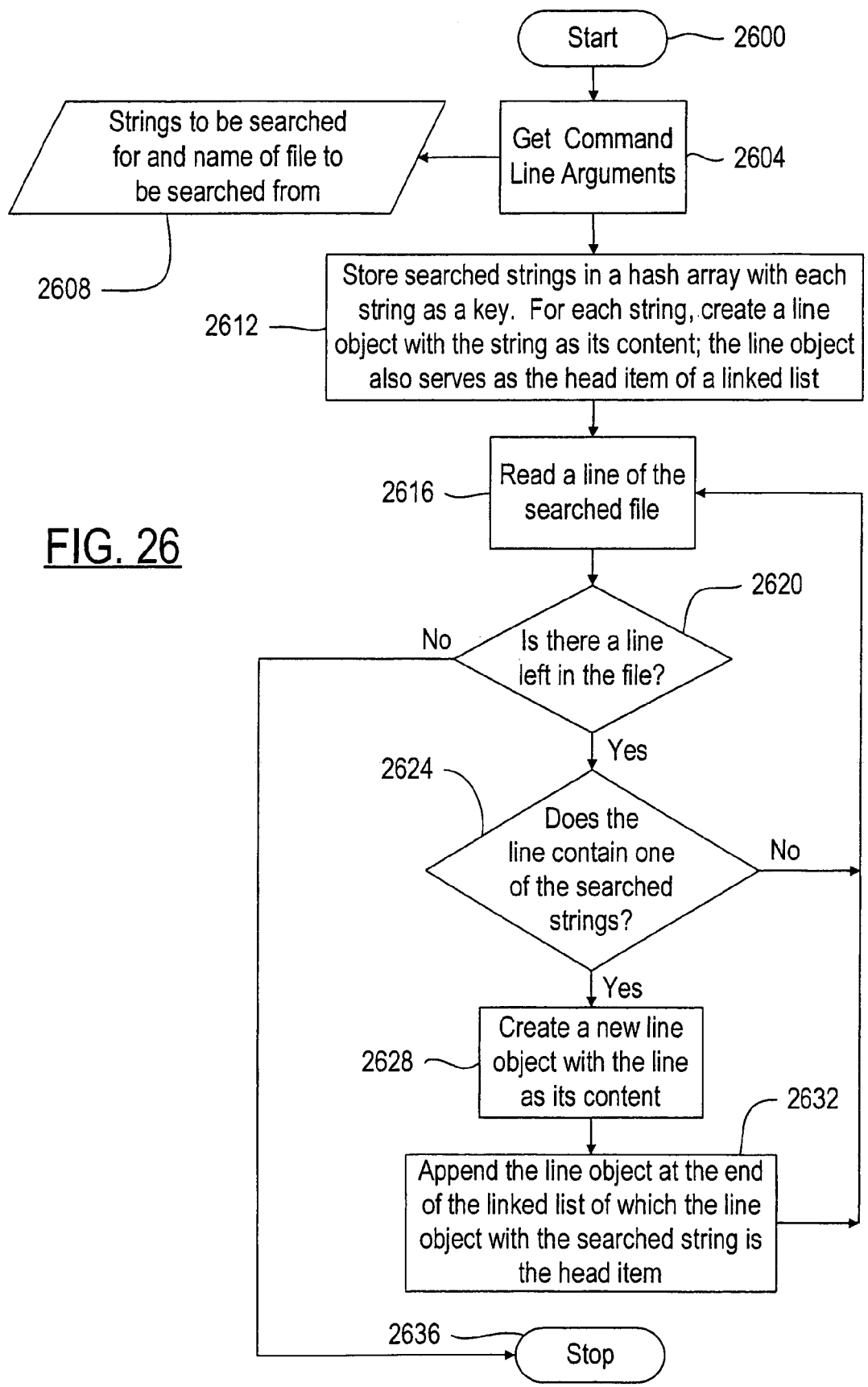
FIG. 26 is a flow chart describing how the program module searches for directories of similar properties as candidates for merger.

FIG. 26, as shown in blocks 2600, 2604 and 2608, indicates the Search Procedure begins by obtaining the strings to be search for and the name of the file to be searched by taking them from the command line. The search strings are stored in a hash array in which each string is the key a shown in block 2612. For each string, a line object with the string as its content is created. The line object also serves as the head item of a linked list. The hash array and the line object may be implemented in any Object-Oriented programming language such as C++ or Java. The Search Procedure then reads a line of the searched file as shown in block 2616. If the line read contains one of the searched strings, then a new line object is created with the line as its content as shown in block 2628. The line object is then appended at the end of the linked list of which the line object with the searched string is the head item as shown in block 2623. The Search Procedure then reads the next line in the searched file as shown 2616. If the line read by the Search Procedure does not contain the searched string, then the Search Procedure reads the next line in the file as shown in blocks 2624 and 2616.

An application of the Search Program is to search for the names of some menu items in file that contains the concatenations of the contents of all menu configuration files as depicted in block 250. The results of the Search Program may be used in at least two ways. The first is to identify the menus containing the searched menu items. A user knows which menus he or she wishes to bring up, based upon what the user is looking for. The second is to identify directories that contain similar menu configuration files. These directories may be candidates to be merged by the Merge Program at the user's discretion.

Hardware Platforms. Those in the art should appreciate that the systems and methods of the present invention are, in the usual software-based implementation, considered to be an application. In this regard, the systems and methods of the present invention may be implemented as one or more applications on any suitable hardware platform(s) running under the control of any suitable operating systems.

Further Description Not Needed. The systems and methods of the present invention need not be further described here since those skilled in the art, based on the teachings of the present invention, will readily understand how to implement the same. This in part is due to the widespread use of conventional operating systems and commands therein to initiate the start of various application programs and the opening of various files and/or databases. The systems and methods of the present invention may be used on distributed computer systems, such as local area networks (LANs), wide area networks (WANs) and Internet-based networks. The widespread knowledge about and use of various commands to invoke programs as just noted between computers on such networks makes it unnecessary to further explain the details of these command protocols. Moreover, any suitable programming approach and any known communications and database protocols and software tools familiar to those writing software programs and related commands may be used to implement the systems and methods of the present invention. These programming approaches include using relational databases and object-oriented programming components. Also, the systems and processes of the present invention may be written as a set of interrelated programs or routines in any suitable programming language (or set of languages) such as but not limited to object-oriented languages.

The present invention has been described in part by reference to block diagrams, flow diagrams and elements of systems and steps of methods. As is well known, suitable program instructions or coding provided in software are used to turn general purpose computers and/or processors into programmed computers and/or processors to form systems capable of carrying out a specific application, such as the teachings of the present invention.

Tangible Media as an Implementation. Also, the software or other coding employed to implement the present invention may be provided in any suitable form of computer program code embodied in tangible media, such as but not limited to floppy diskettes, CD-ROMs, hard drives, static or flash memory, or any other computer readable storage medium. When such computer program code or other code, containing the needed instructions, is loaded into and is ready for execution by suitable computers/processors, such programmed computers/processors become an apparatus for practicing the invention. Thus, it should be appreciated that another embodiment of the present invention is the computer program code needed for carrying out the processes of the present invention when it is embodied in a tangible medium.

The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

The invention claimed is:

1. A menu generation system for use by ordinary computer users that enables the user to readily construct and modify menus and submenus to execute user-prepared commands, the system comprising:

a program operable by an ordinary computer user to construct a viewable main menu with a plurality of user-defined choices thereon, and if desired at least a first viewable submenu which may be accessed by the user through a choice made on the main menu, the program including a first component operable by an ordinary computer user to construct the viewable main menu, with the component automatically providing at least first, second and third user-selectable choices on the main menu, the first and second choices being automatically provided by the system, the first choice being for creating a new menu item on the main menu, the second choice being for creating a new submenu, and the third choice being to quit the current menu;

a second component operable by an ordinary computer user to modify the content of the main menu and the content of any submenus as a menu item;

a third component operable by an ordinary computer user to create a submenu, the third component including a viewable indicator selectable by the user for menu item;

a fourth component operable by an ordinary computer user to create and modify a plurality of storage locations used by the menu generation system for storing operating commands used by the menu generation system for launching other executable programs accessible to the computer user, and for storing data that is referenced as part of creating and displaying user-viewable menus;

a fifth component operable to permit a user to prepare directories to be merged, copy menu files which have identical names, and merge directories recursively; and a component operable for tracking creations of files in a plurality of local activity summary files and in a global activity summary file.

2. A menu generation system as in claim 1, wherein the fourth component is operable to access at least a plurality of files normally stored in the storage locations, the files including at least one command map file and at least one menu configuration file, and wherein the command map file is arranged to store a plurality of operating commands and a set of aliases used as an shortcut technique for referencing certain ones of the operating commands; and the menu configuration file is arranged to store data that is referenced as part of the process of creating and displaying a menu.

3. A menu generation system as in claim 1, further comprising:
a fifth component operable to allow a user to create at least a plurality of individual menu items associated with respective user-selected programs to be launched, with each such menu item being operable at runtime to perform a launch of its respective program by selection of the menu item.

4. A menu generation system as in claim 3, wherein the fifth component is further arranged to enable the user to specify, in conjunction with a menu item and the program to be launched that is associated therewith, at least one file that is to be automatically opened when the program to be launched is executed upon selection of the menu item.

5. A menu generation system as in claim 1, wherein operating commands associated with menu items are stored in a dynamic array.

6. A menu generation system as in claim 1, further comprising:
a fifth component operable to allow a user to create at least a plurality of individual menu items to be selected by an ordinary user which launch an Internet browser, and enable the user to selectively specify if desired a web page to be opened in connection with a particular menu item upon the launch of the Web page.

7. A menu generation system as in claim 6 wherein the fifth component is arranged to allow an ordinary user to specify hyperlinks in connection with user-selected menu items, whereby the menu items are operable, upon be chosen, to retrieve a specified web page, a specified document, a specified document portion or the like through the use an Internet browser program as the operating command in conjunction with such menu items.

8. A menu generation system as in claim 1, wherein the fifth component is operable to merge the local activity summary files if their parent directories are merged.

9. A menu generation system for use by ordinary computer users that enables the user to readily construct and modify menus and submenus to execute user-prepared commands, the system comprising:
a program operable by an ordinary computer user to construct a viewable main menu with a plurality of user-defined choices thereon, and if desired at least a first viewable submenu which may be accessed by the user through a choice made on the main menu, the program including;
a first component operable by an ordinary computer user to construct the viewable main menu, with the component automatically providing at least first, second and third user-selectable choices on the main menu, the first and second choices being automatically provided by the system, the first choice being for creating a new menu item on the main menu, the second choice being for creating a new submenu, and the third choice being to quit the current menu;
a second component operable by an ordinary computer user to modify the content of the main menu and the content of any submenus as a menu item;
a third component operable by an ordinary computer user to create a submenu, the third component including a viewable indicator selectable by the user for menu item; and
a fourth component operable by an ordinary computer user to create and modify a plurality of storage locations used by the menu generation system for storing operating commands used by the menu generation system for launching other executable programs accessible to the computer user, and for storing data that is referenced as part of creating and displaying user-viewable menus,
wherein the program is operable to flatten a directory tree structure by using menus and submenus to represent relationships among directories and their subdirectories.

10. A menu generation system as in claim 9, further comprising:
a fifth component operable to search strings from a source file by storing the searched strings in a hash array with each string as a key.

11. A menu generation system as in claim 10, wherein the fifth component is operable to create a line object for each searched string, and wherein such line objects each have the searched string as its content.

12. A menu generation system as in claim 11, wherein the fifth component is operable so that the line objects if desired can be used a head item of a linked list.

13. A menu generation system as in claim 12, wherein the fifth component is operable so that for each searched string and a line in the source file that contains the string, the fifth component is operable to create a new line object, and wherein such a line object has the line as its content.

14. A menu generation system as in claim 13, wherein the fifth component is operable to append a newly created line object to an associated linked list.

* * * * *

UNITED STATES PATENT AND TRADEMARK OFFICE
CERTIFICATE OF CORRECTION

| | | |
|---|---|---|
| PATENT NO. | : 7,254,784 B2 | Page 1 of 1 |
| APPLICATION NO. | : 10/639940 | |
| DATED | : August 7, 2007 | |
| INVENTOR(S) | : Peter H. Chang | |

It is certified that error appears in the above-identified patent and that said Letters Patent is hereby corrected as shown below:

At Sheet 2 of 19 (Box 270) (FIG. 2), Line 1: Delete "Formated" and insert -- Formatted --, therefor.

At Sheet 17 of 19 (Box 2404) (FIG. 24), Line 2: Delete "entires" and insert -- entries --, therefor.

At Column 2, Line 30 (Approx.): After "submenu." delete "the" and insert -- The --, therefor.

At Column 4, Line 62: Before "any" delete "a".

At Column 5, Line 20: After "used" delete "a".

At Column 7, Line 6: After "field" insert -- . --.

At Column 14, Line 28: In Claim 1, after "including" insert -- : --.

At Column 15, Line 49: In Claim 9, after "including" delete ";" and insert -- : --, therefor.

Signed and Sealed this

Eleventh Day of March, 2008

JON W. DUDAS
*Director of the United States Patent and Trademark Office*